United States Patent
Frenkel et al.

(10) Patent No.: US 12,467,982 B2
(45) Date of Patent: Nov. 11, 2025

(54) SYSTEM AND METHOD FOR DETECTING GROUND FAULTS IN POWER DISTRIBUTION GRIDS

(71) Applicant: METRYCOM COMMUNICATIONS LTD., Herzliya (IL)

(72) Inventors: Liron Frenkel, Netanya (IL); Shay Frenkel, Tel Aviv (IL)

(73) Assignee: MEGGER GRID ANALYTICS LTD, Herzliya (IL)

( * ) Notice: Subject to any disclaimer, the term of this patent is extended or adjusted under 35 U.S.C. 154(b) by 190 days.

(21) Appl. No.: 18/035,759

(22) PCT Filed: Nov. 17, 2021

(86) PCT No.: PCT/IL2021/051373
§ 371 (c)(1),
(2) Date: May 8, 2023

(87) PCT Pub. No.: WO2022/107138
PCT Pub. Date: May 27, 2022

(65) Prior Publication Data
US 2023/0417843 A1  Dec. 28, 2023

Related U.S. Application Data

(60) Provisional application No. 63/114,542, filed on Nov. 17, 2020.

(51) Int. Cl.
*G01R 31/52* (2020.01)
*G01R 31/08* (2020.01)
(Continued)

(52) U.S. Cl.
CPC ........... *G01R 31/52* (2020.01); *G01R 31/085* (2013.01); *H02H 1/0061* (2013.01); *H02H 3/042* (2013.01)

(58) Field of Classification Search
CPC ...... G01R 31/00–52; G01R 31/08–088; G01R 15/142; H02H 1/0061; H02H 3/042; H02H 7/263; Y04S 10/52; H04Q 9/00
See application file for complete search history.

(56) References Cited

U.S. PATENT DOCUMENTS

| | | | |
|---|---|---|---|
| 2010/0185336 A1* | 7/2010 | Rovnyak | H02J 3/38 700/287 |
| 2013/0064178 A1* | 3/2013 | Cs | H04Q 9/00 370/328 |
| 2020/0321766 A1* | 10/2020 | Neyret | H02H 7/26 |

FOREIGN PATENT DOCUMENTS

| | | | |
|---|---|---|---|
| CN | 202166714 U | * | 3/2012 |
| CN | 103376387 A | * | 10/2013 |
| CN | 111398730 A | * | 7/2020 |

OTHER PUBLICATIONS

Texas Instruments. Grid IoT Reference Design: Connecting Fault Indicators, Data Collector, Mini-RTU Using Sub-1 GHz RF, TI Designs: TIDA-00816, 2018. Retrieved from the internet at: <https://www.ti.com/lit/ug/tidued2/tidued2.pdf?ts=1645358506430>Aug. 31, 2018 (Aug. 31, 2018) Section 2.4.1 and Figure 2.

* cited by examiner

*Primary Examiner* — Lee E Rodak
*Assistant Examiner* — Demetrius R Pretlow
(74) *Attorney, Agent, or Firm* — SOROKER AGMON NORDMAN RIBA

(57) ABSTRACT

A method of detecting faults in three-phase power lines, including sampling current from die three phase power lines using a set of three sensors each located on a respective power line, processing the current samples from each of the three power lines and translating them to a representation of the current in the respective power lines using a processor provided in each of the sensors, wherein one of the sensors (Continued)

serves as a master sensor and two of the sensors serve as slave sensors, transmitting to the master sensor the representation of the current using a transceiver provided in each sensor, calculating, a representation of a three phase current from the representation of the current from the master sensor and the slave sensors, and identifying at the master sensor, a possible fault in the three phase power lines responsive to the calculated representation of the three phase current.

5 Claims, 4 Drawing Sheets

(51) Int. Cl.
*H02H 1/00* (2006.01)
*H02H 3/04* (2006.01)

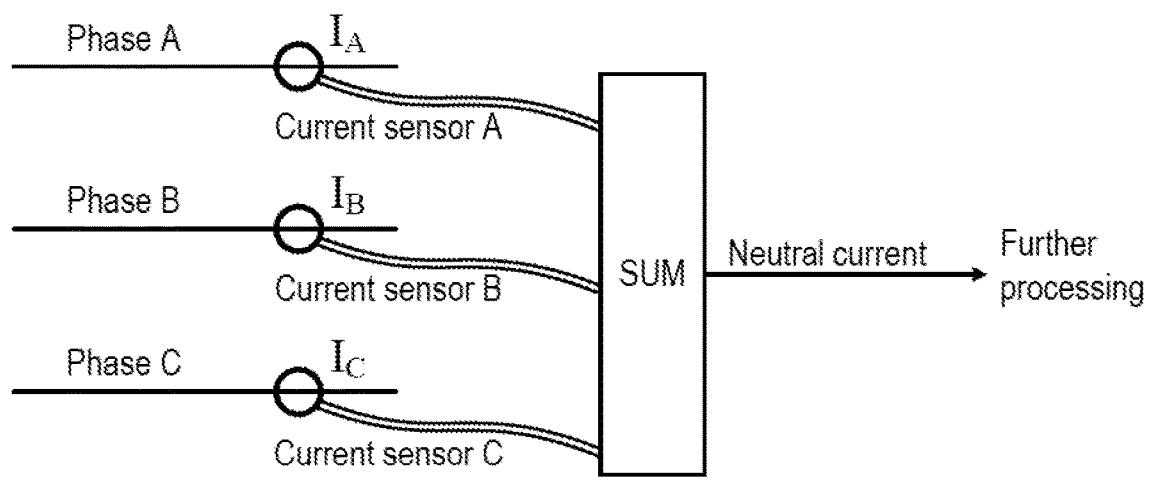
Figure 1 – prior art
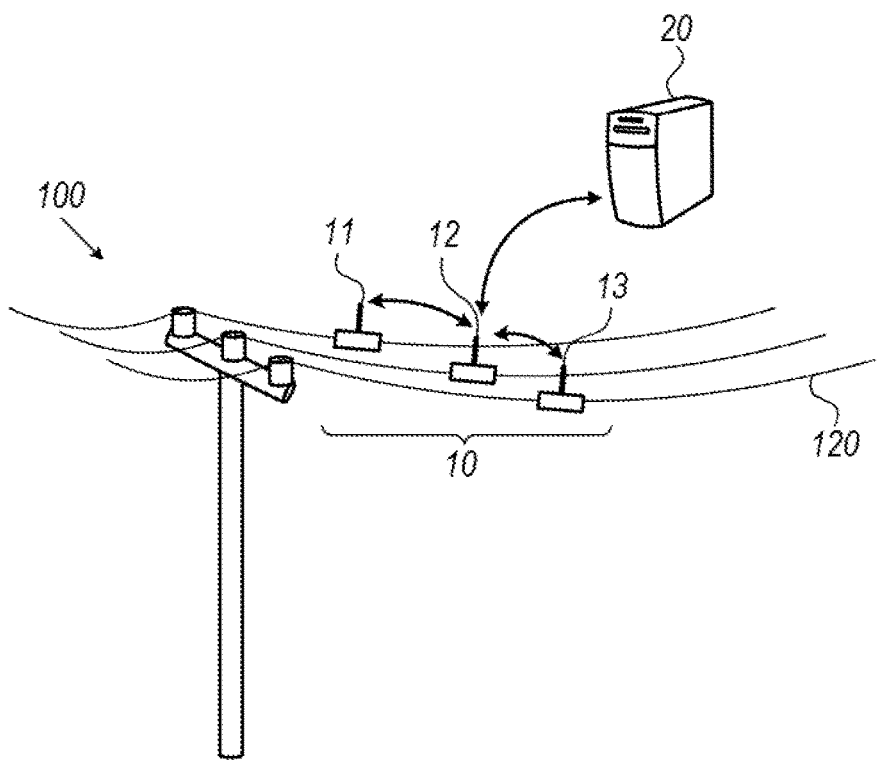
Figure 2A

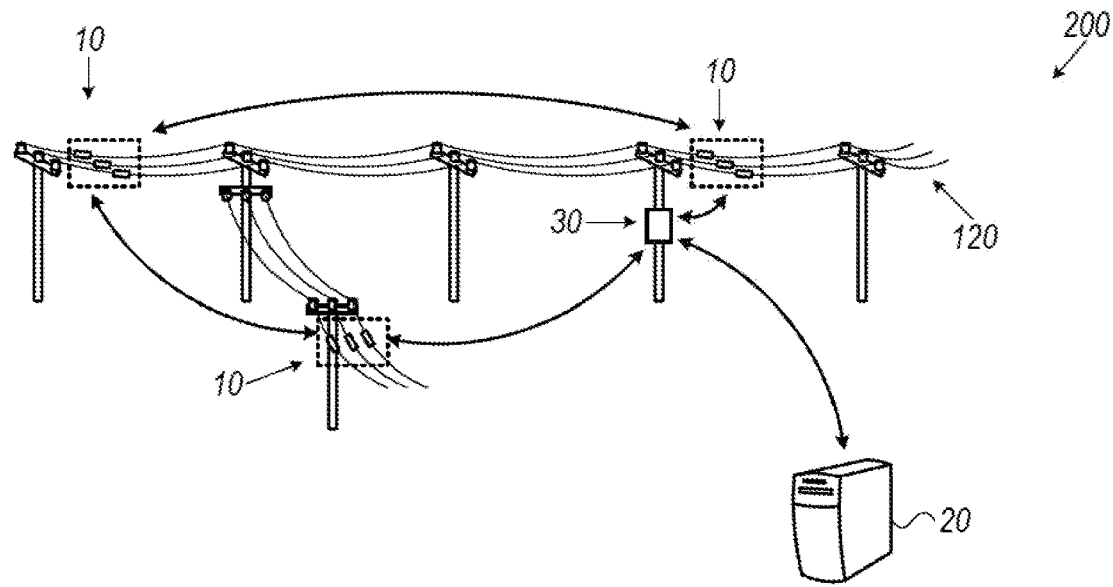
Figure 2B
Figure 3
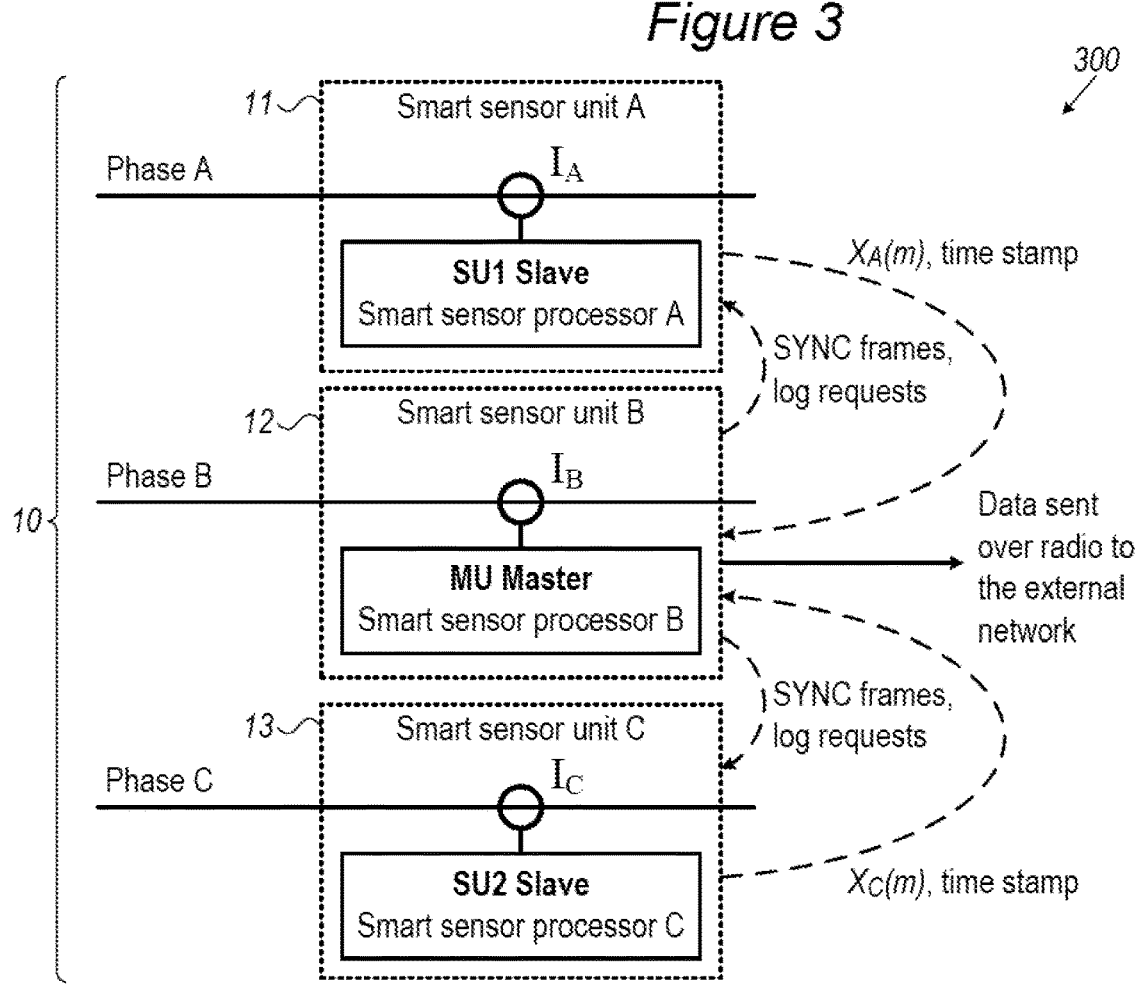

SYSTEM AND METHOD FOR DETECTING GROUND FAULTS IN POWER DISTRIBUTION GRIDS

RELATED APPLICATIONS

The present application claims priority from U.S. Provisional application No. 63/114,542 filed on Nov. 17, 2020, the disclosure of which is incorporated herein by reference.

FIELD OF THE INVENTION

The present disclosure relates generally to a system and method for detection and localization of faults in power distribution systems.

BACKGROUND OF THE INVENTION

Systems without Fault Indicators:

In power distribution grids, upon occurrence of a fault in a power line the protection system trips, and the line is powered down. The system then tries to automatically reconnect the power to the feeder, however, if the attempt to reconnect the power fails, the power is turned off and a maintenance team needs to search for the location of the fault along the lines. During the search, the maintenance team disconnects segments of the circuit using disconnect switches and tries to apply power again. If the fault is repeated, this operation is continued until the faulty segment (s) are found. Some power utilities use remotely controlled switches and reclosers. Remotely controlled reclosers reduce the search time. However, due to economic considerations, most of the disconnecting switches are usually manual, and the search time is long. Some power utilities do not disconnect power automatically even if a fault continues, and in this case searching the location of the fault is performed without disconnecting the power. In such a case it is even more difficult to find the location of the fault.

Using "trial and error" type methods for finding the location of power line faults has substantial drawbacks. Most of the switches in the lines are usually manual because of the relatively high cost of remote reclosers. Thus, when a fault occurs, the entire circuit is automatically disconnected. Even if several remote controlled reclosers are deployed along the circuit, the deployment is usually sparse, and cannot be used to locate the exact segment were the fault occurred. After isolating a segment remotely, it is necessary to further isolate the exact faulted segment in the field by manually switching off parts of the circuit. If the maintenance team could obtain accurate information about the location of the fault in advance, they would be able to directly reach the actual disconnected switches and quickly isolate the faulted segment, thereby searching time for locating the fault and outage time would be reduced considerably.

Systems with Fault Indicators:

Current fault indicator systems in three-phase distribution grids include a device that sums the currents of the three phases in order to measure the neutral sequence current (see FIG. 1). This is required in order to null load currents when the line is balanced. However, summing the currents of the three phases requires connecting cables to three current sensors and insulation of the equipment from the voltage of the line. Such a setup is costly in overhead lines, mainly because of the required insulation, the need for potential and current transformers, and power feeding requirements.

Other currently used fault indication systems implement three wireless sensors, which are deployed on the three phase wires and are synchronized by GPS. Each sensor senses the current and the electric field. A change in the current of the electric field triggers sending fault related information to a server for further processing. However, the single-phase trigger of each sensor is based on single-phase information, which reduces the performance of the trigger compared to a three-phase trigger that is based on three-phase information.

Accordingly, there is a need for a system and method for detecting faults in power distribution systems that may locate the exact location of the power line fault in a cost effective and accurate manner.

SUMMARY

The disclosure relates to a system and method for detecting faults in three phase overhead distribution grids. According to the present disclosure, two of the three sensors in a set are defined as slave sensors and one sensor is defined as a master sensor. The slave sensors and the master sensor use three-phase triggers and communication methods inside the set of sensors in order to detect small changes in zero sequence current or zero sequence voltage that provides an indication of a fault in the power line. When a fault is detected the master sensor sends the information to a main server via a radio network. In addition, the present disclosure includes methods for efficient communication between a set of sensors in a mesh radio network.

According to a first embodiment of the present disclosure, each slave sensor may continuously sample the current of the wire and its electric field, which corresponds to the wire's voltage, and may continuously record the samples. Each slave sensor may also process the sampled information and periodically send the results to the master sensor. When the master sensor receives the periodic processed information from the slave sensors, it further processes the information from the slave sensors together with its own sampled information in order to decide on issuing a three-phase trigger for a possible fault. If the master sensor decides to generate a three-phase trigger, the master then fetches the recorded voltage and current samples, i.e., the "waveforms" from the slave sensors, processes them in order to detect if there was an electric fault in the line at a location of the sensors and may further classify the fault. The master sensor then sends the detection and classification information to the server using wireless communication. At a later stage the server may also optionally fetch the sampled waveforms from the master sensor for storage and further analytics.

According to a second embodiment of the present disclosure, the sensors may monitor the sampled current and voltage information and create a first single-phase trigger when an unexpected change is detected. Each of the slave sensors may then send the first single-phase trigger to the master sensor. When the master sensor receives a single-phase trigger from a slave and/or when a single-phase trigger occurs in the master sensor itself, the master sensor fetches the waveforms from the slave sensors, processes them in order to decide if there was an electric fault in the line at the location of the sensors and may further classify the fault. The master sensor may then send the detection and classification information to the server using wireless communications. At a later stage the server may also optionally fetch the sampled waveforms from the master sensor for storage and further analytics.

There is thus provided according to an embodiment of the disclosure, a system for detection of faults in a three-phase power line, comprising:

A set of three sensors located each on a respective power line of the three phase power lines; wherein each sensor is configured to sample current from the respective power line on which the sensor is located;

Wherein each of the sensors comprises a processor configured to process the current samples and translate them to a representation of the current in the respective power line;

Wherein each of the sensors comprises a transceiver;

Wherein one of the sensors serves as a master sensor and two of the sensors serve as slave sensors;

Wherein the slave sensors are configured to transmit the representation of the current with the transceiver to the master sensor;

wherein the master sensor is configured to calculate a representation of a three phase current in the three phase power lines from the representation of the current from the master sensor and the slave sensors; and wherein the master sensor is configured to identify a change in the calculated representation of the three phase current in the power lines and generate a three phase trigger to activate handling the change.

In an embodiment of the disclosure, the master sensor is configured to communicate identified fault information to a central server. Optionally, the identified fault information includes a location of the fault with respect to a location of the set of three sensors. In an embodiment of the disclosure, the master sensor is configured to communicate identified fault information to a central server via a network of sets of three sensors deployed on the three phase power lines. Alternatively, the master sensor is configured to communicate identified fault information to a central server independent of any other sets of three sensors deployed on the three phase power lines. In an embodiment of the disclosure, the master sensor and slave sensors sample currents synchronously based on synchronization messages provided by the master sensor. Optionally, the representation transmitted by the slave sensors include recorded samples of the current and/or electric field recorded by the slave sensors. Alternatively or additionally, the representation transmitted by the slave sensors include phasor representations of the recorded samples of the current and/or electric field recorded by the slave sensors. Optionally, each of the three sensors is configured to generate a single phase trigger when a change in the current samples exceeds a predetermined threshold value. In an embodiment of the disclosure, the master sensor is configured to generate a zero sequence representation of the current in the power lines and identify faults in the power line if the zero sequence current is greater than a predetermined threshold value.

There is further provided according to an embodiment of the disclosure, a system for detection of faults in a three-phase power line, comprising:

a set of three sensors located each on a respective power line of the three phase power lines; wherein each sensor is configured to sample current from the respective power line on which the sensor is located;

wherein each of the sensors comprises a processor configured to process the current samples and translate them to a representation of the current samples in the respective power line;

wherein each of the sensors comprises a transceiver;

wherein one of the sensors serves as a master sensor and two of the sensors serve as slave sensors;

wherein each of the three sensors is configured to generate a single phase trigger identifying a fault in a single phase when a change in the current samples exceeds a predetermined threshold value;

wherein the master sensor is configured to communicate identified fault information to a central server via a network of sets of three sensors deployed on the three phase power lines;

wherein when a slave sensor generates a single-phase trigger the master sensor is configured to request the slave sensors to transmit information of the representation of the current samples at the slave sensor; and the master sensor is configured to generates a zero sequence representation of the current in the power line from the representation of the current samples; when the master sensor detects in the zero sequence a current above a predetermined threshold or a change of zero sequence current above a predetermined threshold, the master sensor detects a fault in the power line and notifies the central server.

Optionally, the representation of the current samples provided by the slave sensors are recorded samples of the current and/or electric field in the slave sensors. Alternatively, the representation of the current samples provided by the slave sensors are the phasor representation of the recorded samples of the current and/or electric field in the slave sensors.

In an embodiment of the disclosure, the network of sets of three sensors is a mesh radio communication network. Optionally, the sensors in each set operate according to at least two communication modes, said at least two communication modes comprising:

normal communication mode wherein master sensors are communicating with other master sensors via a communication channel of the mesh radio network; and waveform transfer mode wherein master sensors are communicating with slaves sensors via a second communication channel and waveforms are transferred from the slave sensors to the master sensors.

In an embodiment of the disclosure, the second communication channel is a different radio carrier. Optionally, the transceiver within each set of sensors uses internal timeslots and the mesh radio communication between the master sensors in the network uses external timeslots.

BRIEF DESCRIPTION OF THE DRAWINGS

Some non-limiting exemplary embodiments or features of the disclosed subject matter are illustrated in the following drawings.

FIG. 1 is a schematic illustration of a fault indicator for a three-phase system, according to prior art;

FIGS. 2a-2b are illustrations of an arrangement of smart grid sensors, according to an embodiment of the disclosure;

FIG. 3 is fault indicator system, according to an embodiment of the disclosure;

Figure 4A:
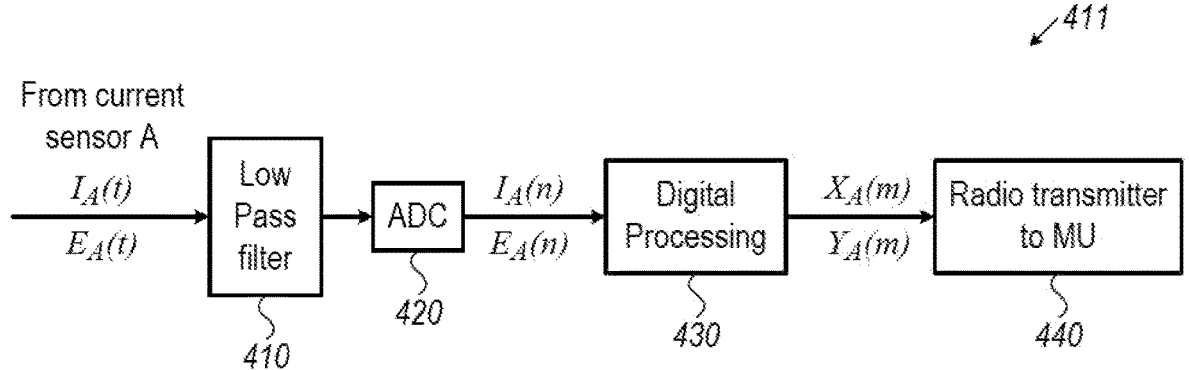
FIGS. 4a-4b are block diagrams of two slave fault indication units and processing methods, according to an embodiment of the present disclosure.

With specific reference now to the drawings in detail, it is stressed that The details of the illustrations are shown by way of example and for the purpose of illustrative discussion of embodiments of the disclosure. In this regard, the description taken with the drawings makes apparent to those skilled in the art how embodiments of the disclosure may be practiced.

Identical or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or with true perspective. For convenience or clarity, some elements or structures are not shown or shown only partially and/or with a different perspective or from a different point of view.

DETAILED DESCRIPTION OF THE INVENTION

According to the present disclosure, a system 100 is provided with the primary objective to perform online detection and localization of faults in power lines 120, including high impedance faults. High impedance faults are difficult to detect because the changes in currents and voltages that they generate are small. Therefore, it is difficult to trigger a detection process when a high impedance fault happens.

In accordance with the present disclosure, a network 200 of wireless power line fault indicators may be used for monitoring faults in a distribution grid. When a fault occurs, the network 200 may indicate the location of the fault. Using this information, a maintenance team may disconnect and isolate the faulty segments rather than implement trial and error tactics, and thus substantially minimize the search time. This may be more cost effective compared to current methods due to a reduction in energy invested in the search process of current systems. Innovative methods and apparatuses are used according to the present disclosure in order to detect high impedance faults while maintaining a low power consumption, and while sustaining high performance in extreme weather conditions that may affect the measurement or reading of the electric field.

Reference is now made to FIGS. 2a-2b, which are schematic illustrations of a typical arrangement of smart grid sensors according to the present disclosure. According to some embodiments, FIG. 2a illustrates a set of three sensors 10 (including sensors 11, 12, 13), each sensor is located on a different electric phase. These three sensors 10 may maintain radio connectivity between one another. One of the sensors (sensor 12) may be defined as the "master sensor", and may be connected to a server 20 by various communications means (e.g., cellular communication), while the other two sensors (11, 13) may be defined as "slave sensors". The master sensor 12 may process information received from each of the two slave sensors (11, 13) to make a decision on an occurrence of a fault after which the master sensor 12 may classify the fault type (e.g. high impedance or electrical short). According to some embodiments, FIG. 2b illustrates another embodiment of the disclosure, where multiple sets of sensors 10 may be used; each set may include two slave sensors (11, 13) and one master sensor 12, and each set of three sensors 10 may communicate (typically via the master sensor 12) with other sets of sensors 10 or routers 30 using, e.g., communicating by mesh radio communications until the master sensor 12 reaches the routing gateway 30. The routing gateway 30 may route the information to the server by cable or by a different type of wireless communication (e.g. cellular network).

Wireless Set of Three Sensors 10 with Periodic Information Sent from Two Slave Sensors (11, 13) to a Master Sensor 12 which Implements a Three-Phase Triggering Mechanism As illustrated in FIG. 2b, according to a first embodiment of the present disclosure, three smart-grid sensor units 10 may be installed on the respective wires of the different phases. One of the sensors may be defined as the master 12, while the other two sensors may be defined as slave sensors (11, 13). The master sensor 12 may receive information via radio transmission from the other two slave sensor units in order to detect power line faults based on three phase information. Optionally, the information communicated from the slave sensors (11, 13) to the master sensor 12 may be a low resolution representation of the current sensed by the slave sensors (11, 13) or the information may be at a low sampling rate. In an embodiment of the disclosure, if the master sensor 12 suspects that a fault occurred, the master sensor 12 triggers a fault handling process ("three-phase trigger") that may request that the slave sensors (11, 13) transmit additional information to improve the accuracy of the detection. If a fault occurred, the master sensor 12 may send the fault related information to main server 20. Sending the data to the main server 20 may be done by sending it to other sensors (11, 12, 13) or gateways 30 in a mesh radio network, via a cellular network, or by other communication methods. According to the present disclosure, the fault indication units or fault indication sensors may implement unique algorithms capable of detecting changes in small fault currents and small fault voltages and may therefore be optimized to detect high impedance faults.

Reference is now made to FIG. 3, which schematically illustrates a fault indicator system 300 according to embodiments of the present disclosure. Three sensors 10 may be used, one on each wire (phase) of the power line 120, which may communicate over a wireless link. Two of the sensors are defined as slave sensors 11, 13 (also designated as slave unit 1 (SU1) and slave unit 2 (SU2)) and the third sensor is defined as the master sensor 12 (also designated as master unit (MU)). The master sensor 12 sends synchronization messages to the slave sensors (11, 13) which may be used for synchronizing the communication between the three sensors 10.

Reference is now made to FIG. 4a, which is a block diagram of a first SU1 Slave sensor unit 11 and processing method 411 according to an embodiment of the disclosure. $I_A(n)$ denotes the sampled current waveform data of phase A. $E_A(n)$ denotes the sampled electric field waveform data of phase A. $X_A(m)$ denotes a sample of the current phasor, and $Y_A(m)$ denotes a sample of the electric field phasor.

Figure 4B:
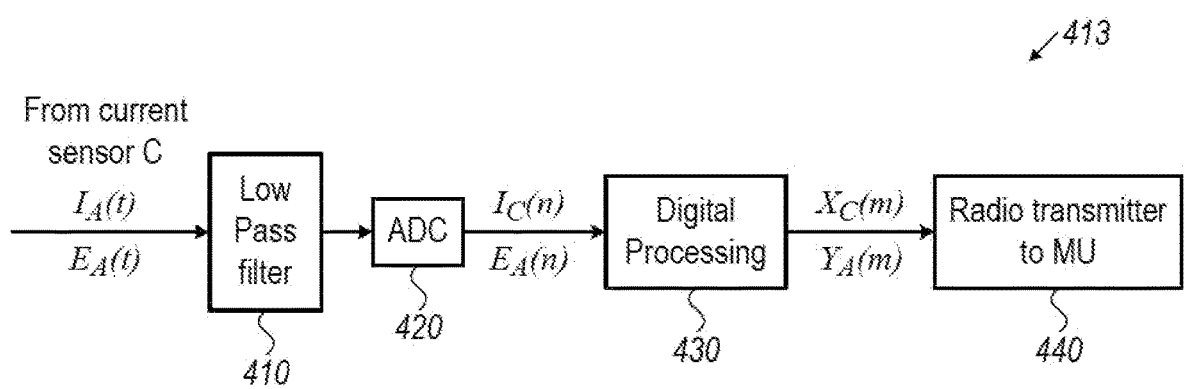

FIG. 4b is a block diagram of a second SU2 slave fault indication unit 13 and processing method 413 according to an embodiment of the disclosure.

Figure 4C:
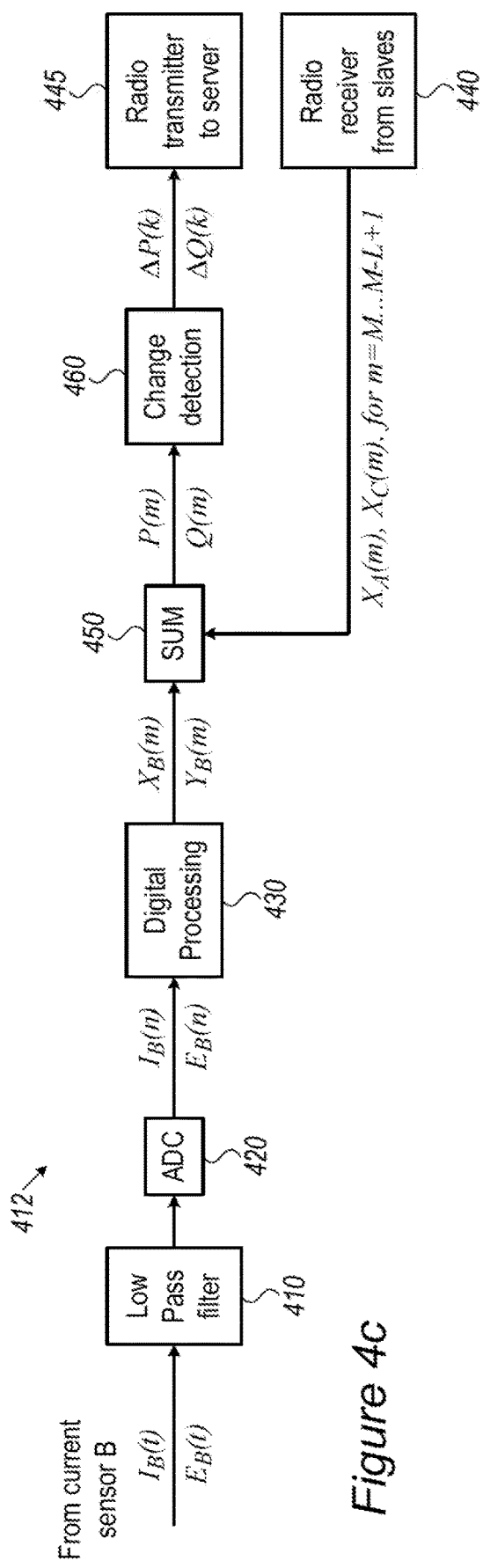
FIG. 4c is a block diagrams of a master fault indication unit and processing method, according to an embodiment of the present disclosure

FIG. 4c is a block diagram of a 'MU'—Master sensor unit 12 and processing method 412 according to an embodiment of the disclosure.

In an embodiment of the disclosure, each of the sensors (11, 12, 13) includes the following hardware units and/or software modules:

1. A low pass filter 410 to reduce noise from the sampled current;
2. An analog to digital converter (ADC) 420 to sample the current and provide a digital representation;

3. A digital processing unit 430 comprising a processor and memory to analyze the sampled currents and provide a representation of the current in the sampled power line 120;

4. A radio transmitter/transceiver 440 configured to enable the sensors (11, 12, 13) to communicate with each other.

In an embodiment of the disclosure, the master sensor 12 may further include an additional transceiver 445 to communicate with the routing gateway 30 and/or server 20. The master sensor may also include an independent unit 450 (in addition to the digital processing unit 430) to summate current representation information and a change detection unit 460 to identify changes in the currents and thus identify faults in the power lines 120.

According to some embodiments, Equation (i) is used for digital processing blocks (correlation of the sampled currents with S(n)):

(i)

$$X_A(m) = \sum_{n=1}^{N} R(n) \cdot I_A(n+mN) \quad \text{(equation 1)}$$

$$X_B(m) = \sum_{n=1}^{N} R(n) \cdot I_B(n+mN) \quad \text{(equation 2)}$$

$$X_C(m) = \sum_{n=1}^{N} R(n) \cdot I_C(n+mN) \quad \text{(equation 3)}$$

Whereby:

$R(n) = \exp(j2\pi F_{mains} \cdot n \cdot T_s - \Phi)$, $X_A(m)$, $X_B(m)$, $X_C(m)$ are phasor representations of $I_A(n)$, $I_B(n)$, $I_C(n)$ $F_{mains} = 50$ H or 60 Hz, and $T_s$ denotes the sampling rate of the currents $I_A(n)$, $I_B(n)$, $I_C(n)$ and the electric fields, e.g. $T_s = 125$ µs.

The sum of equations 1-3 may be performed over a time interval $N \cdot T_s$ which includes an integer number of periods of R(n). A new sum may be performed for each increment of m.

In an embodiment of the disclosure, the MU 12 (Master fault indication Unit) sends radio synchronized messages to the slaves 11 SU1 and 13 SU2. The slave units (11, 13) may use these synchronization signals in order to synchronize the phase $\Phi$ of R(N) to the phase of the master 12 MU and this way all the units may be sampling the currents and voltages synchronously, e.g., at the same time period. In another embodiment of the present disclosure, the synchronization may be achieved by other means, e.g. by GPS or by synchronizing to another radio signal. The synchronized slaves (11, 13) communicate with the MU 12 in predetermined synchronized time slots to save radio power, and the units and radio may be switched to sleep mode between transmissions, in active time slots, in order to save power consumption. A typical example for the period of time slot is 1 second, though other time slots may be implemented.

The phasor representations $X_A(m)$, $X_B(m)$, $X_C(m)$ may be calculated periodically with a period of $N \cdot T_s$, which equals an integer number of cycles of the mains AC voltage (e.g., 20 ms for 50 Hz systems or 16.6 ms for 60 Hz systems). For example, $N \cdot T_s = 1$ cycle of 50 Hz=20 ms, $T_s = 125$ µs, N=160. Another example may comprise $N \cdot T_s = 8$ cycles of 50 Hz=160 ms, $T_s = 125$ µs, N=1280. The interval length may be determined as a tradeoff of power consumption associated with the wireless transmission of the information by the radio. m increases after each calculation interval. The phasors may be logged between transition time slots, and on the transmission timeslot the logs of the slaves (11, 13) are transmitted in a radio packet to the MU 12:

SU1 transmitted log: $X_A(m)$

SU2 transmitted log: $X_C(m)$, where m=M, M−1, M−2, ... M−L+1, and L is the depth of the log.

In an embodiment of the present disclosure the phasor data may be compressed before it is transmitted. The compression utilizes the fact that the complex phasors $X_A(m)$, $X_B(m)$, $X_C(m)$ are usually not changing. Therefore, the following algorithm ("log-on-change algorithm") can be used for each phase A (phase C is similar):

Last_$X_A = X_A(1)$

For each new $m_A$:

if $|X_A(m_A) - \text{Last}\_X_A| >$ Threshold add $m_A$ and $X_A(m_A)$ to the transmitted log Last_$X_A = X_A(m_A)$ The comparison to a threshold may be done in different ways as long as it indicates a change in the complex phasor $X_A(m_A)$. On the transmission timeslot the log of each slave (11, 13) is transmitted in a radio packet to the MU 12:

SU1 transmitted log: $m_{A1}$, $X_A(m_{A1})$, $m_{a2}$, $X_A(m_{A2})$,

SU2 transmitted log: $m_{C1}$, $X_C(m_{C1})$, $m_{C2}$, $X_C(m_{C2})$,

The depth of the log may vary according to the changes. When the master unit or master sensor 12 receives the log, it reconstructs the original series $X_A(m)$ and $X_C(m)$ by duplicating the phasors between the indexes that were logged, for example:

$X_A(m_{A1}), X_A(m_{A1}), X_A(m_{A1}), X_A(m_{A2}), X_A(m_{A2}), X_A(m_{A2}),$
$X_A(m_{A2}),$ $X_C(m_{C1}), X_C(m_{C1}), X_C(m_{C2}), X_C(m_{C2}), X_C(m_{C2}), X_C(m_{C3}), X_C(m_{C3}),$

In addition, according to an embodiment of the present disclosure, the fault indication units may save the sampled waveform data $I_A(n)$, $I_B(n)$, $I_C(n)$, which is later used for further analysis of the fault. A typical buffer size for storing the sampled waveform data may be between a few seconds up to a few hours.

When the data sent from the sensors ($X_A(m)$, $X_C(m)$) is received or reconstructed by the MU 12, the MU 12 calculates the zero-sequence phasor $X_Z(m)$ of each sample m as follows:

$$X_Z(m) = X_A(m) + X_B(m) + X_C(m) \quad \text{(equation 4)}$$

It should be noted that this method is mathematically equivalent to first summing up the analog currents from all the sensors 10 (as one in FIG. 1), correlate them with R(t): $X_Z(t) = \int [I_A(t) + I_B(t) + I_C(t)] * R(t)$, and then sample P(t) in order to obtain P(m).

Going back to FIG. 4c, the zero-sequence phasor $X_Z$ (m=M) may then be sent to the change-detection block, where the old phasor $X_Z$ (m=M−j) is subtracted from the last phasor before the trip, $X_Z$ (m=M):

$$\Delta X_Z(M) = X_Z(M) - X_Z(M-j)$$

According to some embodiments, the MU 12 compares the absolute value of the change $|\Delta X_Z(M)|$ to a predetermined threshold and if it is larger than the threshold a trigger occurs (i.e., a 'three-phase trigger').

In another implementation of the present disclosure, the MU 12 compares the absolute value of $|X_Z(M)|$ to a predetermined threshold and if it is larger than the threshold a three-phase trigger occurs.

Optionally, the MU 12 includes a CPU, which fetches the sampled current waveforms $I_A(n)$ and $I_C(n)$ from the sensors via wireless communication related to the timestamp of the three-phase trigger, and analyzes the waveforms in order to decide if the three-phase trigger is valid, i.e., if a fault has occurred in the timestamp of the three-phase trigger using one of many algorithms known to the art to perform such a detection when the sampled current and electric field (or voltage) information is already available.

In another embodiment of the present disclosure, a decimated sampling of IA(n) may be used and logged instead of the complex phasors X(m). i.e., $$I_A(m)=I_A(mN) \quad \text{(equation 5)}$$

$$I_B(m)=I_B(mN) \quad \text{(equation 6)}$$

$$I_C(m)=I_C(mN) \quad \text{(equation 7)}$$

Whereby N denotes the decimation factor. Thus, the sampling interval is reduced from $T_s$ to $NT_s$. $NT_s$ should be larger or equal to four times the mains frequency, for example $NT_s$=5 ms for mains frequency of 50 Hz.

The log is transmitted as follows:
SU1 transmitted log: $I_A(m)$
SU2 transmitted log: $I_C(m)$
where m=M, M−1, M−2, . . . M−L+1,
and L is the depth of the log.

When the master receives the log it calculates the zero sequence current as follows:

$$Iz(m)=I_A(m)+I_B(m)+I_C(m) \quad \text{(ii)}$$

The MU 12 then compares the RMS value of Iz(m) samples that corresponds to each cycle period to a predetermined threshold and if it is larger than the threshold a three-phase trigger occurs.

In an embodiment of the disclosure, the decimated samples $I_A(mN)$ are sent to the MU 12 only if there is a significant change in the sample compared to the previous mains frequency cycle. The concept is similar to the said "log-on-change algorithm" with the exception that $I_A(m_{A1})$, $I_A(m_{A2})$ . . . are used instead of $X_A(m_{A1})$, $X_A(m_{A2})$ . . . .

In another embodiment of the present disclosure, the entire process is done with the master routing gateway 30 that communicates with three sensors 10 and performs the functions of the master sensor 12. In this implementation there may be three slave sensors 10 communicating with master routing gateway 30.

According to another embodiment of the present disclosure, the sampled electric field ($E_A(n)$, $E_B(n)$, $E_C(n)$) may be used to produce the trigger instead of the sampled current ($I_A(n)$, $I_B(n)$, $I_C(n)$). The electric field is approximately proportional to the voltage, and therefore a change of the electric field represents a change in the voltage. The method that is described above applies also to the electric field, using:

$E_A(n)$, $E_B(n)$, $E_C(n)$ instead of $I_A(n)$, $I_B(n)$, $I_C(n)$
$Y_A(m)$, $Y_B(n)$, $Y_C(n)$ instead of $X_A(m)$, $X_B(n)$, $X_C(n)$, and
Q(m) instead of P(m)

Wireless Set of Three Sensors 10 with a First Single-Phase Trigger Performed in Each of the Sensors and a Second Three-Phase Trigger and Detection Performed in a Master Sensor 12

According to a second embodiment of the disclosure, each sensor 10 in the set may monitor the sampled current and electric field information and when a change is detected it may generate a single-phase trigger. Slave sensors (11, 13) may send their single-phase trigger to the master sensor 12 and the master sensor 12 may also generate an internal single-phase trigger in the same way. Following the reception of a single-phase trigger from one of the slave sensors (11, 13) or the generation of an internal single-phase trigger in the master sensor 12 itself, the master sensor 12 requests the slave sensors (11, 13) to send the recent phasor representations $X_A(m)$, $X_C(m)$, (or in another embodiment of the disclosure the decimated samples $I_A(m)$, $I_C(m)$). As a response, the slave sensors (11, 13) calculate $X_A(m)$ and $X_C(m)$ (or in another embodiment of the disclosure it receives the decimated samples $I_A(m)$, $I_C(m)$) from the recorded current waveforms $I_A(n)$ and $I_C(n)$, and the master sensor 12 then generates a three-phase trigger from the information $X_A(m)$, $X_B(m)$, $X_C(m)$ (or in another embodiment of the disclosure from the decimated samples $I_A(m)$, $I_C(m)$) according to the methods that were described hereinabove for the first embodiment of the present disclosure. The master sensor 12 consecutively sends the fault detection decision and the fault's classification to the server 20 using similar methods.

Method of Fault Detection Using a First Single-Phase Trigger in the Slave Sensor (11, 13) and a Decision Process in the Master Sensor 12 Based on a Three-Phase Zero-Sequence Information:

According to a third embodiment of the present disclosure, each sensor in the set of sensors 10 monitors the sampled current and electric field information and when a change is detected it generates a first single-phase trigger. Slave sensors (11, 13) send their first single-phase trigger to the master sensor 12 and the master sensor 12 also generates an internal first single-phase trigger in the same way. Following the reception of a first single-phase trigger from one of the slave sensors (11, 13) or the generation of an internal first single-phase trigger in the master sensor 12 itself, the master sensor 12 may then immediately fetch the recorded sampled currents $I_A(n)$ and $I_C(n)$, i.e., the waveforms, (or in another embodiment of the disclosure it fetches a decimated representation of these samples or phasor representation of the current) from the sensors 10 via wireless communication. The master sensor 12 analyzes the waveforms in order to decide if the single-phase triggers are valid, i.e., if a fault has occurred in the timestamp of the single-phase trigger by generating a representation of the zero sequence current in the three phase power line 120 from the sensors' waveforms, and detecting that at least the zero sequence current (or a change in the zero sequence current according to another embodiment) is above a threshold. In one embodiment of the present disclosure, the zero-sequence representation of the three phase power line may be calculated as an average of the samples of the current waveform samples:

$$I_Z(n)=(I_A(n)+I_B(n)+I_C(n))/3$$

In another embodiment, the zero-sequence representation is calculated as an average of the phasors:

$$I_Z(m)=X_A(m)+X_B(n)+X_C(n)$$

whereby the phasors $X_A(m)$, $X_B(n)$ and $X_C(n)$ are defined in equations 1-3 hereinabove.

Figure 5:
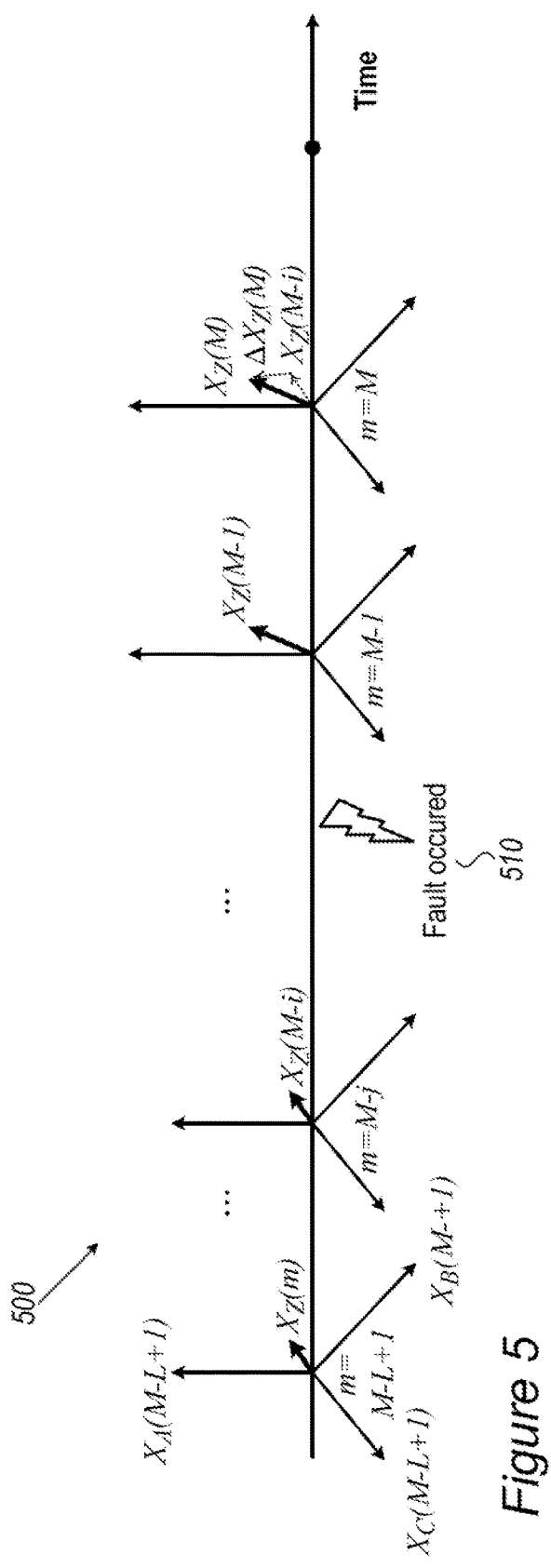
FIG. 5 is a schematic illustration of a phasor representation before a fault and after the fault, according to an embodiment of the disclosure.

FIG. 5 is a schematic illustration of a phasor representation 500 before a fault 510 and after the fault 510, according to an embodiment of the disclosure.

According to an embodiment of the disclosure, multiple sets of sensors 10 may be used in a mesh radio network 200, and the mesh radio communication in the network 200 may be performed between the master sensors 12 of the different sets of sensors 10, as illustrated in FIG. 2b. In one embodiment of the disclosure, the mesh radio communication is based on a 'frequency hopping' method known in the art, and in another embodiment of the present disclosure, all the sensor sets 10 use a single frequency channel. The sensors 10 in each set are always synchronized between themselves by synchronization messages that are sent from the master sensor 12, and the master sensor 12 is always synchronized to mesh radio network 200.

According to some embodiments, there may be two modes of communication between the sensors 10 in each set and between different sets in the mesh radio network 200:
1. Normal communication mode: In this mode the master sensor 12 in each set of sensors 10 is operating as a normal node in the mesh radio network 200, which may include the master sensor 12 receiving and sending messages to other master sensors 12 in the network 200; and
2. Waveform transfer mode: In this mode, in some of the timeslots, the master sensor 12 ignores messages from the mesh radio network 200 and performs extensive internal communications with the slave sensors (11, 13) using another communication channel, while maintaining synchronization with the mesh radio network including the time slots' structure by using at least one timeslot for synchronization message or by other synchronization means.

When one of the three sensors (11, 12, 13) in a sensors set 10 detects a change in voltage or current that qualifies as a single-phase trigger (e.g., the change is compared to a threshold), it sends a single-phase trigger message to the master sensor 12. According to one embodiment of this disclosure, the single-phase trigger messages may be sent in predetermined timeslots that are assigned for the purpose of internal messages within the set (i.e., "internal timeslots"). In some embodiments, the location of the internal timeslots in a frame may be similar per all the sets in the network 200. According to this embodiment, the mesh radio communication between master sensors 12 of different sets in the network 200, may be performed during other different time slots (i.e., "external timeslots"). Accordingly, the mesh radio communication between the sensor sets 10 does not interfere with the internal messages between sensors (11, 12, 13) within each set 10.

According to some embodiments, after receiving the single-phase trigger of a fault from a slave sensor (11, 13), the master sensor 12 may inform the slaves that the mode of communication should change from normal communication mode to waveforms transfer mode and all the master sensors 12 and the slave sensors (11, 13) of the current set 10 and of other sets 10 change their mode accordingly. Upon entering the 'waveform transfer mode', the master sensor 12 may begin fetching all the required recorded waveforms from the slave sensors (11, 13)(or phasor representation, according to another embodiment) after which the set 10 may switch back to 'normal communication mode'. According to some embodiments, all the sensors (11, 12, 13) in a set 10 may change the carrier frequency of a mesh radio network of some timeslots to a new carrier frequency, when the sensors (11, 12, 13) enter 'waveform transfer mode'. The new carrier frequency may be a fixed frequency or a frequency with offset from the frequency hopping channel. This method ensures that the fetching of the recorded waveforms from the slave sensors (11, 13) is not interfering with the communication between the current sensor set 10 and other sensor sets 10 in the network 200, which may be located in close proximity to the current set 10. In addition most of the timeslots may be used for fetching the samples in order to complete the fetching operation promptly, whereas dividing timeslot resources between different sets 10 in order to avoid interference reduced the number of available timeslots. According to another embodiment of the disclosure, the fetching of the waveforms may be done with increased bit rate and/or decreased transmit power compared to the bit rate and the transmit power of radio communication between sensor sets 10 in the mesh radio network 200.

In another embodiment of the disclosure, each sensors set 10 in the mesh radio network 200 may include multiple subsets, each subset may include three sensors (11, 12, 13), where each one of the three sensors is deployed on a different phase in the same location along the power line. One of the sensors in the set is defined as master sensor 12 and when a fault happens, the master sensor 12 may receive the current waveforms or phasor representation from each of the subsets one after the other, may run a detection algorithm for each subset, and may send the detection decision regarding each subset via the mesh radio network 200.

According to yet another embodiment of the present disclosure, each set of sensors 10 receives a unique set number, and the frequency offset which is used for each set 10 when fetching of the samples is determined according to this set number. This makes it possible to avoid radio interruptions when several sets 10 are fetching recorded samples in parallel, which is a common case. Then, the fault in the line triggers multiple sets 10, and allows to use the same radio power and bit rate.

The invention claimed is:
1. A system for detection of faults in a three-phase power line, comprising:
a set of three sensors located each on a respective power line of the three phase power lines;
wherein each sensor is configured to sample current from the respective power line on which the sensor is located;
wherein each of the sensors comprises a processor configured to process the current samples and translate them to a representation of the current samples in the respective power line;
wherein each of the sensors comprises a transceiver;
wherein one of the sensors serves as a master sensor and two of the sensors serve as slave sensors;
wherein each of the three sensors is configured to generate a single phase trigger identifying a fault in a single phase when a change in the current samples exceeds a predetermined threshold value;
wherein the master sensor is configured to communicate identified fault information to a central server via a network of sets of three sensors deployed on the three phase power lines;
wherein when a slave sensor generates a single-phase trigger the master sensor is configured to request the slave sensors to transmit information of the representation of the current samples at the slave sensor; and the master sensor is configured to generates a zero sequence representation of the current in the power line from the representation of the current samples; when the master sensor detects in the zero sequence a current above a predetermined threshold or a change of zero sequence current above a predetermined threshold, the master sensor detects a fault in the power line and notifies the central server;
wherein the network of sets of three sensors is a mesh radio communication network;
wherein the sensors in each set operate according to at least two communication modes, said at least two communication modes comprising:
normal communication mode wherein master sensors are communicating with other master sensors via a communication channel of the mesh radio network; and
waveform transfer mode wherein master sensors are communicating with slaves sensors via a second commu- nication channel and the representations of the current samples are transferred from the slave sensors to the master sensors.

2. The system of claim 1, wherein the representation of the current samples provided by the slave sensors are recorded samples of the current and/or electric field in the slave sensors.

3. The system of claim 1, wherein the representation of the current samples provided by the slave sensors are the phasor representation of the recorded samples of the current and/or electric field in the slave sensors.

4. The system of claim 1, wherein the second communication channel is a different radio carrier.

5. The system of claim 1, wherein the transceiver within each set of sensors uses internal timeslots and the mesh radio communication between the master sensors in the network uses external timeslots.

* * * * *